United States Patent [19]

Kustka

[11] Patent Number: 5,226,082
[45] Date of Patent: Jul. 6, 1993

[54] VARIABLE LENGTH DECODER

[75] Inventor: George J. Kustka, Marlboro, N.J.

[73] Assignee: AT&T Bell Laboratories, Murray Hill, N.J.

[21] Appl. No.: 907,977

[22] Filed: Jul. 2, 1992

[51] Int. Cl.$^5$ ............................................. H04L 9/00
[52] U.S. Cl. ........................................ 380/46; 380/28; 380/37
[58] Field of Search .................. 380/37, 28, 44, 45, 380/46, 47, 49

[56] References Cited

U.S. PATENT DOCUMENTS

| | | | |
|---|---|---|---|
| 4,301,327 | 11/1981 | Lee et al. | 380/28 |
| 4,386,416 | 5/1983 | Giltner et al. | 364/900 |
| 4,908,862 | 3/1990 | Kaneko et al. | 380/28 |
| 4,944,009 | 6/1990 | Micali et al. | 380/46 |

*Primary Examiner*—David Cain
*Attorney, Agent, or Firm*—Henry T. Brendzel

[57] ABSTRACT

Apparatus for decoding a stream containing codes of a variable length code (VLC) takes advantage of the fact that a trie representation of the VLC can be pruned to leaves that each represent a complete binary trie. Combinational circuits or ROMs are then employed to decode the pruned trie, thereby substantially reducing the complexity of decoding a VLC. In one embodiment the decoding problem is partitioned into segments by considering a few bits at a time, starting with the most significant bits. Each segment either outputs a valid code or informs the next segment that the decoding process is incomplete and provides information to assist the next segment in its decoding effort. In applications where the VL code can be selected for greater efficiency of the decoder, the offered VL code can be restructured to minimize the number of k-nodes, to thereby minimize the pruned trie, and to concomitantly minimize the sizes of the ROMs in the decoder.

15 Claims, 6 Drawing Sheets

FIG. 4

| CODE | | ADDRESS | | FIXED LENGTH CODE |
|---|---|---|---|---|
| 1101XX | → | 11XX | 1111 | b9 |
| | | | 1110 | b10 |
| | | | 1101 | b11 |
| | | | 1100 | b12 |
| 111XX | → | 10XX | 1011 | b4 |
| | | | 1010 | b5 |
| | | | 1001 | b6 |
| | | | 1000 | b7 |
| 10XX | → | 01XX | 0111 | b0 |
| | | | 0110 | b1 |
| | | | 0101 | b2 |
| | | | 0100 | b3 |
| 01X | → | 001X | 0011 | b13 |
| | | | 0010 | b14 |
| 1100 | → | | 0001 | b8 |
| 00 | → | | 0000 | b15 |

VARIABLE LENGTH DECODER

BACKGROUND OF THE INVENTION

This invention relates to decoding of signals encoded in a variable length code.

Variable length (VL) coding, such as Huffman coding, is a well known technique that encodes very likely signals with a small number of bits, and less likely signals with a larger number of bits. With this technique, the number of bits used to describe the less likely signals is larger than the number of bits in words of a corresponding fixed-length coding arrangement. The latter is a consequence of the inviolate requirement that one valid code cannot be a prefix of another valid code. In a trie structure representation, this requirement also corresponds to the statement that a node of the trie cannot also be a leaf of the trie.

Two tasks are involved in decoding a stream of bits that correspond to concatenated VL codes (VLCs): identifying the groups of bits that form valid VL codes; and decoding the valid VL codes.

FIG. 1 depicts a prior art arrangement for decoding such a stream. In the decoding process, data appears at a constant rate at line 41 and it is stored in buffer 40 as it is received. Data is extracted from buffer 40 and placed in register 10 under control of line 21, each time fully populating the register. The length of register 10 is equal to the maximum number of bits that a valid VL code can have. The data stored in register 10 is applied to combinatorial circuit 20 which, in each decoding interval, identifies the subset of bits in the data (starting with the oldest bits in register 10) that forms a valid VL code. Circuit 20 outputs on bus 21 the fixed-length code that corresponds to the identified subset of bits that form the VL code, and outputs a control signal on bus 21. Control signal 21 directs buffer 40 to supply a number of new bits to register 10 (for the next decoding interval) to replace the bits in the identified VL code. Thus, buffer 40 serves merely as a signal rate buffer means, allowing the output to operate at the rate corresponding to the rate at which the fixed-length codes were originally converted to the variable length codes, while the input arrives at the bit rate of the variable length codes.

The simplest way to implement circuit 20 is with a look-up table (e.g., a read-only-memory). A read only memory also requires the shortest processing time. The problem with this prior art approach, however, is the size of the memory that is required, which is $2^M$, where M is the number of bits in the longest VL code. For many practical applications, such as for high definition TV (HDTV), M is quite large, perhaps larger than 20, and that makes ROM 20 prohibitively large.

SUMMARY OF THE INVENTION

In accordance with the principles of this invention, decoding complexity is reduced by pruning the trie of the variable length code to its k-node representation, and thereafter decoding the pruned trie. A k-node is a node of the trie which supports a binary number of leaves of any particular number code length and which has no k-nodes in its path toward the root. Representing the decoding problem in its pruned trie form facilitates partitioning of the decoding problem into segments that allow using a smaller number of ROM memory locations for decoding the variable length code. Even in applications where a number of read-only memories are used instead of one read-only memory, the separate read-only memories add up to substantially fewer number of words than in prior art ROM embodiments.

More specifically, the decoding problem is partitioned into segments by considering a few bits at a time, starting with the most significant bits. Each segment either outputs a valid code or informs the next segment that the decoding process is incomplete and provides information to assist the next segment in its decoding effort.

The decoder of this invention can be implemented with a pipeline architecture and with a single ROM that decodes the pruned trie.

In applications where the VL code can be selected for greater efficiency of the decoder, the offered VL code can be restructured to minimize the number of k-nodes, to thereby minimize the pruned trie, and to concomitantly minimize the sizes of the ROMs in the decoder.

BRIEF DESCRIPTION OF THE DRAWING

FIG. 4 illustrates the storage arrangement of codes within the code conversion memory;

DETAILED DESCRIPTION

Table 1 presents an illustrative example of signals b0 through b15 ordered by their probability of occurrence, and a particular Huffman code designed for these signal probabilities.

TABLE 1

| symbol | probability | code |
|--------|-------------|------|
| b0     | .01         | 011111 |
| b1     | .015        | 011110 |
| b2     | .02         | 111111 |
| b3     | .02         | 111110 |
| b4     | .025        | 01110 |
| b5     | .03         | 10111 |
| b6     | .03         | 10110 |
| b7     | .04         | 11110 |
| b8     | .05         | 0110 |
| b9     | .06         | 1010 |
| b10    | .07         | 1110 |
| b11    | .1          | 1101 |
| b12    | .1          | 1100 |
| b13    | .11         | 010 |
| b14    | .12         | 100 |
| b15    | .2          | 00 |

Figure 1:
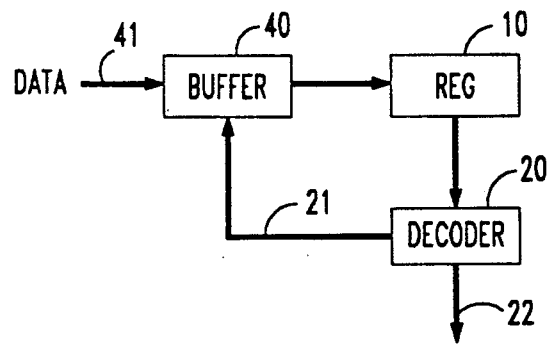
FIG. 1 depicts the prior art arrangement for decoding a variable length code.
Figure 2:
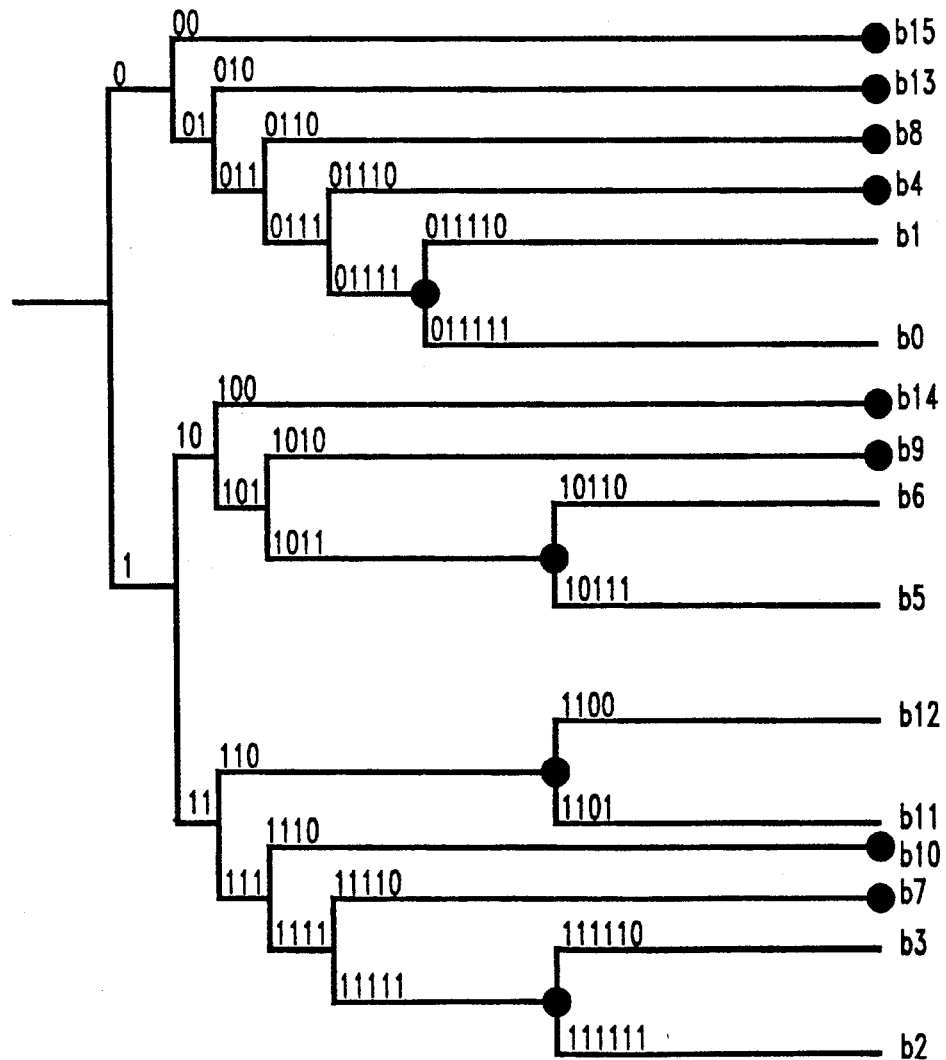
FIG. 2 presents the trie structure of a Huffman code.

The codes derived in table 1 are in accordance with the teachings of Netravali and Haskell in "Digital Pictures", Netravali and Haskell, Plenum Press, New York, 1989, pp. 153. A trie representation of the codes developed in table 1 is depicted in FIG. 2. Since a number of the developed codes contain 6 bits each, in accordance with the FIG. 1 embodiment, the number of words in a ROM embodiment of decoder 20 that decodes the above-defined Huffman code is 64.

A k-node, in the context of this disclosure, is a node of a trie which supports a binary number (a number that corresponds to an integer raised to a power of two) of leaves of any particular code length and which has, in its path toward the root, no other nodes that support a binary number of leaves. In the FIG. 2 trie, there are 12 k-nodes, marked by the dark circles.

In accordance with the principles of this invention, decoding is simplified by decoding only the trie that results from pruning away the branches beyond the k-nodes, leaving a trie with only k-node leaves. The simplification is demonstrated below in connection with the specific example presented in table 1. If pruning the trie to its k-node leaves simplifies decoding, it follows that a benefit accrues from either creating a Huffman code that includes only few k-nodes, or by restructuring a given code to minimize the number of k-nodes.

Creating a Code With a Minimized Number of k-nodes.

The number of k-nodes in a Huffman code can be minimized by constructing a histogram of the given Huffman code and evaluating the histogram. In the illustrative example of table 1, there are:

1 code of length 2(0001),
2 codes of length 3(0010),
5 codes of length 4(0101),
4 codes of length 5(0100),
4 codes of length 6(0100), Since each k-node supports a binary number of leaves, it follows that the number of k-nodes needed to support a group of codes having a particular length is equal to the number of 1's in the binary representation of the number of codes in that group, because each 1 represents a binary number. To illustrate, in the above example there are four codes of length 6. Obviously, those 4 codes require only one k-node because, by definition, a k-node supports a binary number of leaves (codes) and 4 is a binary number. Correspondingly, there is only a single 1 in the binary representation of 4.

From the above, it is easily determined that a reduced number of k-nodes can be derived for the FIG. 2 trie. Indeed, the minimum number of k-nodes that is required—based on the histogram of the codes—is six.

Constructing a code set that yields the six k-nodes is not difficult, as can be surmised from the procedure below (which is not necessarily the only procedure that works).

Select 00 for the one 2-bit code, leaving 01, 10 and 11 for the remainder.
Select 01x for the two 3-bit codes leaving 10 and 11 for the remainder (x is a "don't care").
Select 10xx for four of the needed five 4-bit codes, leaving 11 for the remainder.
Select 1100 for the fifth 4-bit code leaving 1111, 1110, and 1101 for the remainder.
Select 1111x and 1110x (i.e., 111xx) for the four 5-bit codes, leaving 1101 for the remainder. Each x designates a bit in either of its states.
Lastly, select 1101xx for the four 6-bit codes, completing thereby the code assignment.

Figure 3:
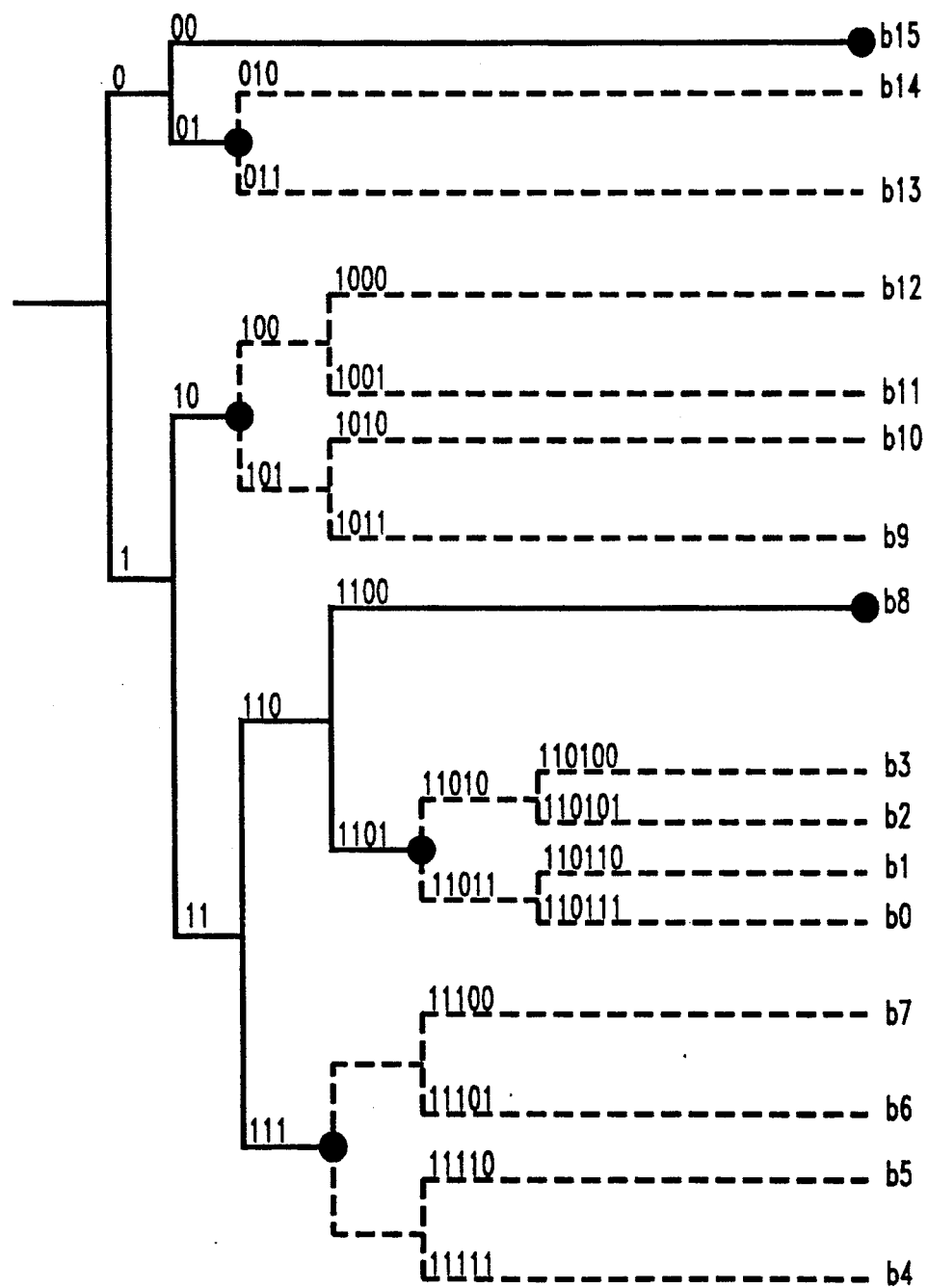
FIG. 3 presents the trie structure of a Huffman code with a minimized number of k-nodes.

The restructured Huffman code is depicted in FIG. 3 and presented in column 3 of table 2 below.

TABLE 2

| symbol | probability | code |
|---|---|---|
| b0 | .01 | 110111 |
| b1 | .015 | 110110 |
| b2 | .02 | 110101 |

TABLE 2-continued

| symbol | probability | code |
|---|---|---|
| b3 | .02 | 110100 |
| b4 | .025 | 11111 |
| b5 | .03 | 11110 |
| b6 | .03 | 11101 |
| b7 | .04 | 111000 |
| b8 | .05 | 1100 |
| b9 | .06 | 1011 |
| b10 | .07 | 1010 |
| b11 | .1 | 1001 |
| b12 | .1 | 1000 |
| b13 | .11 | 011 |
| b14 | .12 | 010 |
| b15 | .2 | 00 |

It is easily observed that the trie of FIG. 3, when pruned to the k-nodes (i.e., the dashed lines blocked out), is smaller than the FIG. 2 trie. Consequently, the ROM that would be necessary to decode this trie is also smaller.

Decoder Implementation

A memory-reduced implementation in accordance with the principles of this invention is based on a bit-wise segmentation of the k-node pruned set; and when it exists, on the k-node minimized set. In the above example, the k-node minimized set is: 00, 01x, 10xx, 1100, 111xx, and 1101xx.

The bit-wise segmentation divides the bits at the output of register 10 into groups and considers each group separately. In a parallel implementation, separate segment hardware is devoted to each group of bits and that hardware attempts to decode the VL code. One implementation of the segment hardware comprises a ROM that is responsive to the bits applied from register 10. The ROM outputs words having five fields, as follows.

Field 1: contains an address pointer prefix that points to a location in a code conversion memory that stores the fixed-length codes that correspond to the detected VL codes;
Field 2: contains a code that indicates the number of additional bits that need to be concatenated to the prefix;
Field 3: specifies how many bits should be shifted into register 10 for the next detection interval;
Field 4: contains a flag bit that indicates whether a valid code has in fact been detected; and
Field 5: contains a code that indicates the state of the decoder when a valid code has not been detected.

In connection with the address pointer prefix in the first field, FIG. 4 depicts one arrangement for the above set of Huffman codes, the address pointer prefixes, and the suffixes that make up the address pointer and their corresponding fixed-length codes, as they are stored in the code conversion memory. At the top of the memory are the three sets of codes that come in groups of four: 10xx, 111xx, and 1101xx. Thereafter comes 01x, which is the only group that contains two codes, and lastly come the single codes 1100 and 00. The address relationship, as well as the stored fixed length codes, are presented in table 3.

TABLE 3

| addresses | Huffman codes | Fixed length codes |
|---|---|---|
| 11xx | 10xx | b9,b10,b11,b12 |
| 10xx | 111xx | b4,b5,b6,b7 |
| 01xx | 1101xx | b0,b1,b2,b3 |
| 001x | 01x | b13,b14 |
| 0001 | 1100 | b8 |

TABLE 3-continued

| addresses | Huffman codes | Fixed length codes |
| --- | --- | --- |
| 0000 | 00 | b15 |

Employing the arrangement of table 3 and selecting the first three bits of register 10 to constitute the first segment permits decoding the Huffman codes 00, 01x, 11xx and 111xx. The corresponding addresses needed for the code conversion memory (per table 3) are 0000, 001x, 01xx and 10xx. These addresses are obtained by combining the output of the first field i.e., the address pointer prefix, with a number of additional register 10 bits (the address pointer suffix), as necessary. This number is specified in the second field of the ROM.

In connection with the state that the decoder is at when a valid code has not been detected, one needs to look only at the undetectable codes. In the example above, the undetectable codes are 1100 and 1101xx. For both of these codes, the three bits that are considered in the first segment present the state 110. In this particular case, therefore, no particular state information needs to be communicated to subsequent segments. Viewed differently, once it is known that a valid code has not been detected, it is known with certainty that the portion of the VL code decoded so far is 110. This represents no information and, accordingly, in this case, the fourth field has zero bits.

Table 4 presents the contents of the ROM in the first segment hardware. Since it handles three bits, it is noted that the ROM of the first segment has only 8 words of storage.

TABLE 4

| address | contents | | | |
| --- | --- | --- | --- | --- |
| | prefix | add | shift | flag |
| 000 | 0000 | 0 | 2 | 1 |
| 001 | 0000 | 0 | 2 | 1 |
| 010 | 0010 | 0 | 3 | 1 |
| 011 | 0011 | 0 | 3 | 1 |
| 100 | 010 | 1 | 4 | 1 |
| 101 | 011 | 1 | 4 | 1 |
| 110 | — | — | — | 0 |
| 111 | 10 | 2 | 5 | 1 |

Considering the next three bits for the second segment and observing that only codes 1100 and 1101xx need to be decoded, it is realized that only one bit is actually needed to be evaluated. If the first of the next three bits is a 0, then the detected code is 1100; otherwise the detected code is 1101xx. Accordingly, the memory in the second segment hardware (and, in this example, last segment hardware) contains only the two words shown in table 5. As an aside, because this segment is also last segment table 5 does not need a flag bit.

TABLE 5

| address | contents | | |
| --- | --- | --- | --- |
| | prefix | add | shift |
| 0 | 11 | 2 | 6 |
| 1 | 0001 | 0 | 4 |

It should be pointed out that the number of decoded bits need not be the same for all of the bit-wise segments. Indeed, in the above example one can comfortably assert that the second segment decodes only one bit. Also, the procedure for selecting the numbers of bits in the various bit-wise segmentations in practical problems may be heuristic, or simulation-driven. Lastly, it is noted that for the above-described example, the total number of memory words needed in the decoder of this invention is 26: 10 in the ROMs leading to the code conversion table and 16 in the code conversion table. This is a substantial reduction from the original 64 words required for the FIG. 1 embodiment.

Figure 5:
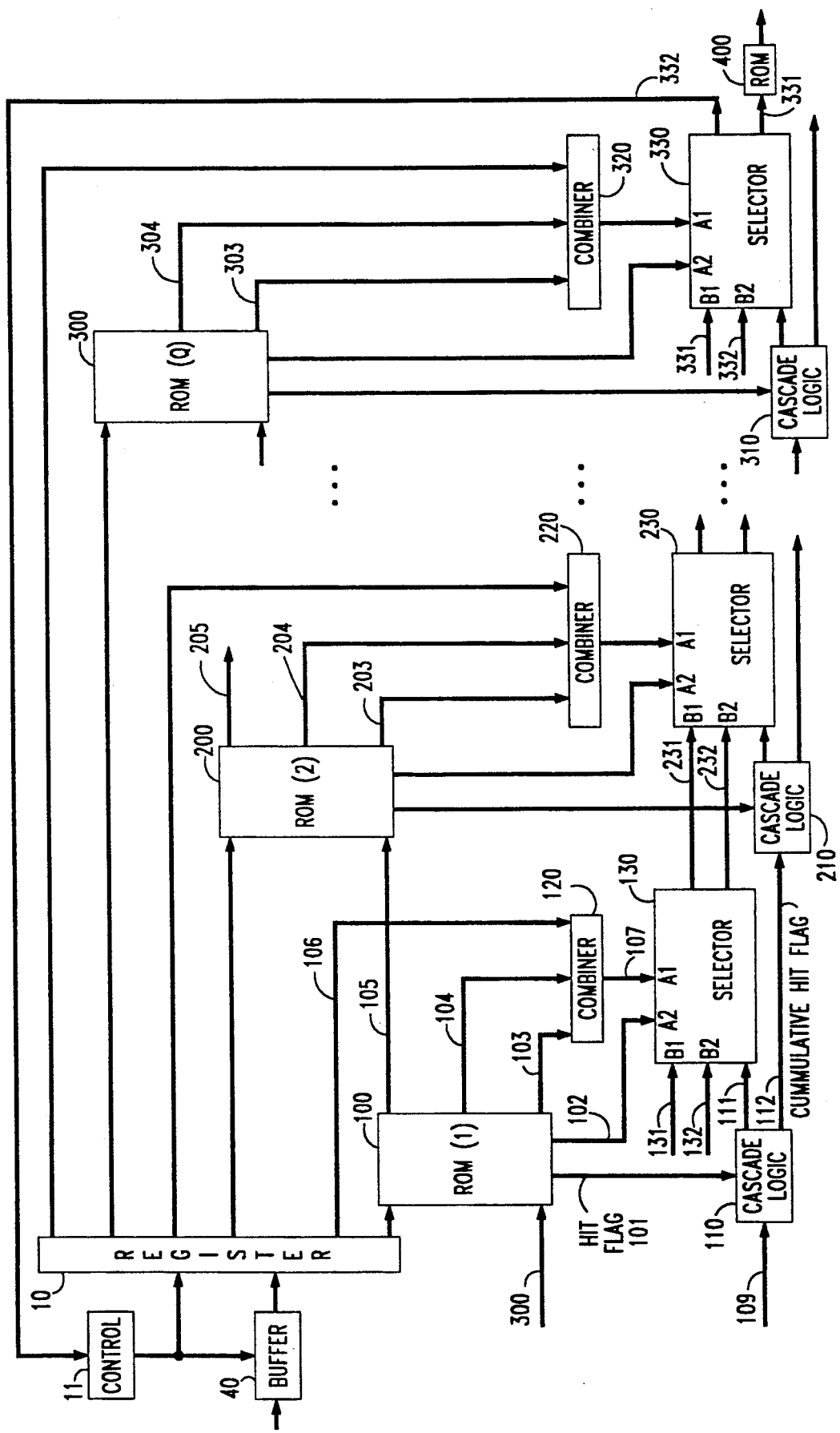
FIG. 5 is a schematic diagram of a variable length decoder in accordance with the principles of this invention.

FIG. 5 presents one embodiment of a decoder in accordance with the above-described principles. The depicted embodiment is larger than is necessary for the specific illustrative example employed above because it is a generalized representation of a decoder for a variable length encoded signal. The more generalized embodiment is presented to more comprehensively teach the invention.

In FIG. 5, read-only memory 100 is responsive to a selected number of the most significant bits at the output of register 10. As indicated above, ROM 100 outputs five fields: a hit flag on line 101, a shift indicator on bus 102, an address pointer prefix on bus 103, a look-ahead indicator on bus 104 and a state indicator on bus 105. Hit flag 101 is applied to cascade logic block 110 which is responsive to cumulative hit flag line 109. (Actually, line 109 is at a fixed logic level in the first segment since it is the first segment in the chain of segments.) Block 110 develops a selected control signal on line 111 and a cumulative hit flag signal on line 112. An active signal on line 112, indicating a "hit", is represented by a logic 0. The selector control signal is an AND function of the signal on lines 101 and 109. The selector control signal is applied to selector 130. The cumulative hit flag signal is an AND function of the signal on line 109 and the inverse of the signal on line 101. The cumulative hit flag signal (the active 0) is applied to the cascade logic block 210 of the next segment hardware.

The address pointer prefix signal and the look-ahead bits are applied to combiner logic block 120. Also applied to logic block 120 is a selected number of bits coming from register 10 via bus 106. Based on the value of the look-ahead bits, a number of signals on bus 106 are concatenated to the address pointer prefix signals of bus 103 to form a single address bus at the output of combiner logic 120, on line 107. For example, when the three most significant bits of register 10 are 101 in the above-described example, according to table 4, three bits out of ROM 100 serve as the pointer prefix and one bit is added from bus 106. The output of combiner 120 in response to this input is 011x. Combiner logic 120 is a simple combinatorial circuit involving a number of gates.

The output of combiner logic 120 (bus 107) is applied to input port A1 of selector block 130. Bus 102 of ROM 100 (the shift indicator field) is applied to input port A2 of selector block 130. Selector block 130 also includes input port B1 that receives an address signal from a previous stage (line 131), and input port B2 that receives a shift indicator signal from the previous stage (line 132). Selector block 130 is arranged to output the signals of ports A1 and A2 when the selector control signal is "1", and to output the signals of ports B1 and B2 otherwise. Selector block 130 also comprises a plurality of interconnected gates.

Lastly, bus 105, which contains a "state" signal is applied to ROM 200. This completes the description of a segment hardware module.

ROM 200, logic combiner 220, selector 230 and cascade logic block 210 form the hardware module for the second segment of bits to be decoded. The contents of ROMs 100 and 200 are not the same. Aside from that, however, both architecturally and structurally the hardware of the two segments can be identical.

As indicated by the three sets of dots, the segment hardware modules are interconnected in a chain, or a pipeline, mode. The last segment hardware comprises ROM 300, combiner logic 320, selector 330 and cascade logic 310. The final output is at selector 330 and that output includes an address on bus 331 and a shift indicator on bus 332. Bus 332 is fed back to control circuit 11 which controls buffer 40 and register 10. More specifically, bus 332 specifies the number of bits in the detected VL code and that is the number of new bits that need to be inserted into register 10. It is the function of control circuit 11 to effect the insertion of new bits. Bus 331 is applied to read-only memory 400 which is the code conversion memory described above in connection with FIG. 4.

The FIG. 5 arrangement applies signals from one segment to the next. Yet, the FIG. 5 VLC decoder is neither a serial decoder nor a pipeline decoder. The flow of signals through the chain of segment hardware modules completes in one decoding interval.

Of course, FIG. 5 only illustrates the principles of this invention, and other embodiments are easily arrived at without departing from the spirit and scope of this invention. For example, although the FIG. 5 arrangement contemplates the use of a buffer 40 ahead of register 10, it is possible to store information directly into register 10 as it arrives, prevent the segments hardware from looking at the data as it is shifted, and output the decoded signals as they become available. If a uniform rate is desired of the output, a buffer can be included at the output of the decoder. Another variation of the FIG. 5 arrangement can employ "collector OR" approaches to reduce the hardware. Still another variation of the FIG. 5 arrangement (as described so far) is to include means for incorporating a plurality of VL codes which could be decoded by the FIG. 5 arrangement. This can be easily realized by increasing the size of the ROMs in each of the segment hardware modules and by providing an additional control line to serve as a selection line. This capability is included, in fact, in the FIG. 5 arrangement via control line 300. The VL code identifier imparted by line 300 is distributed to all of the segments via the state information (bus 105) that chains from one segment module to the next.

Figure 6:
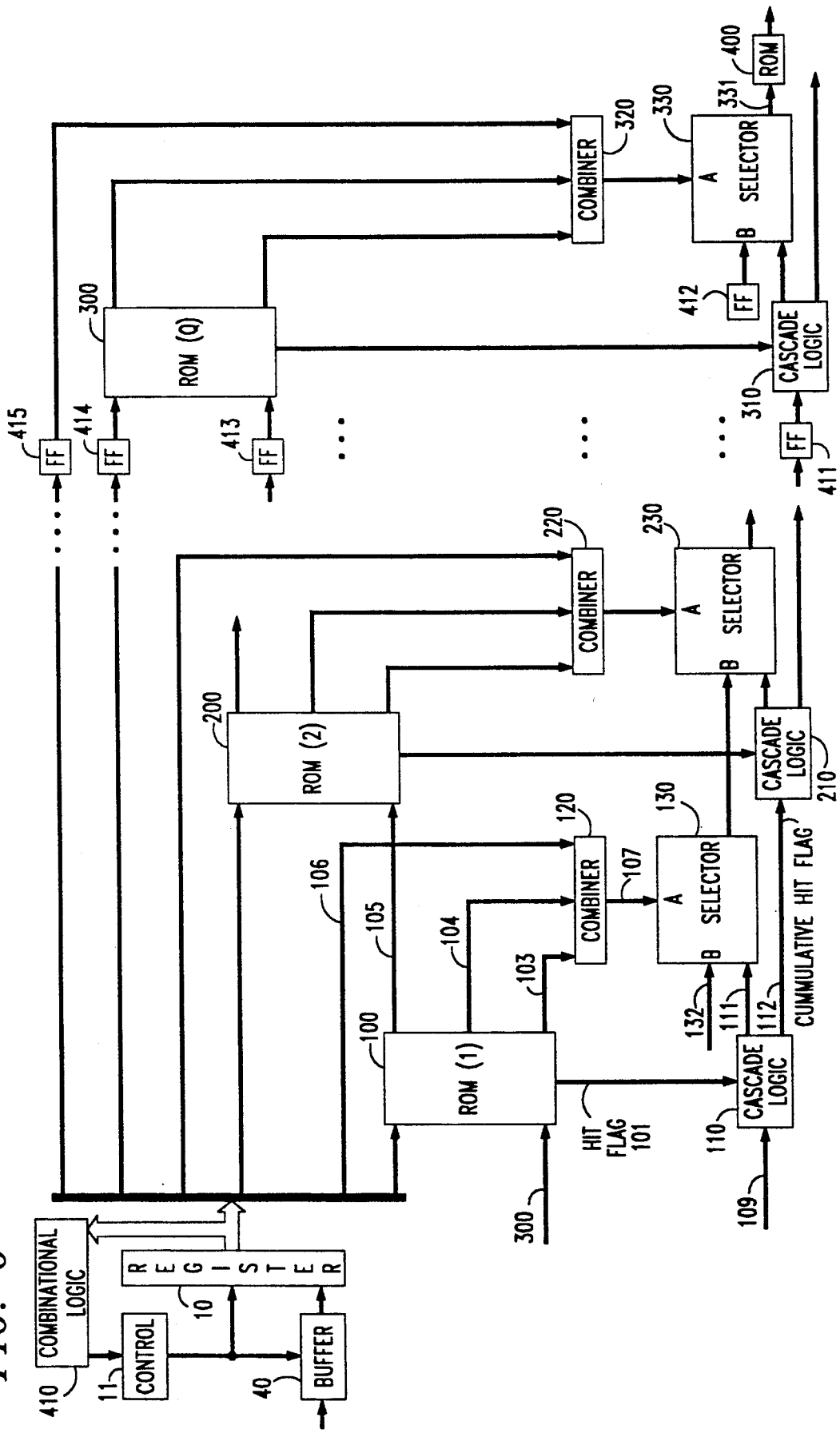
FIG. 6 depicts another realization of the variable length decoder of this invention.

FIG. 6 depicts another realization of the VLC decoder of this invention where the delay in the circuit is larger than desired vis-a-vis the clock frequency. In such instances it is possible to easily convert the FIG. 5 circuit into a true pipeline architecture. The only problem with forming a pipeline arrangement is the need to identify the length of the VLC that is about to be decoded. Taking advantage of this invention's k-node concepts, a combinatorial circuit 410 is connected to the output of register 10. This circuit need only look at a number of bits that corresponds to the number of bits in the longest code of a k-node. In FIG. 3, for example, k-nodes 1100 (symbol b8) and 1101 (symbols b0, b1, b2, b3) have the longest codes—4 bits. Accordingly, the FIG. 6 embodiment of the FIG. 3 trie requires combinatorial circuit 410 to be responsive only to the 4 most significant bits of register 10.

Having dispensed with the need to identify the shift length in the segment modules themselves, FIG. 6 omits lines 102, 132, 232, and 332. Pipelining is achieved by inserting clocking elements (e.g., flip-flops) between selected segment modules. Only flip-flops 411–416 are shown for sake of simplicity, but it should be understood that any number of flip-flop stages can be used.

The FIG. 6 embodiment, being clocked, can also be viewed as a finite state machine. Recognizing this fact, it is possible to reduce the number of components and the interconnections therebetween by combining the various ROMs in FIG. 6 to form a single ROM finite state machine version of the VLC decoder of this invention. This is illustrated in FIG. 7.

Figure 7:
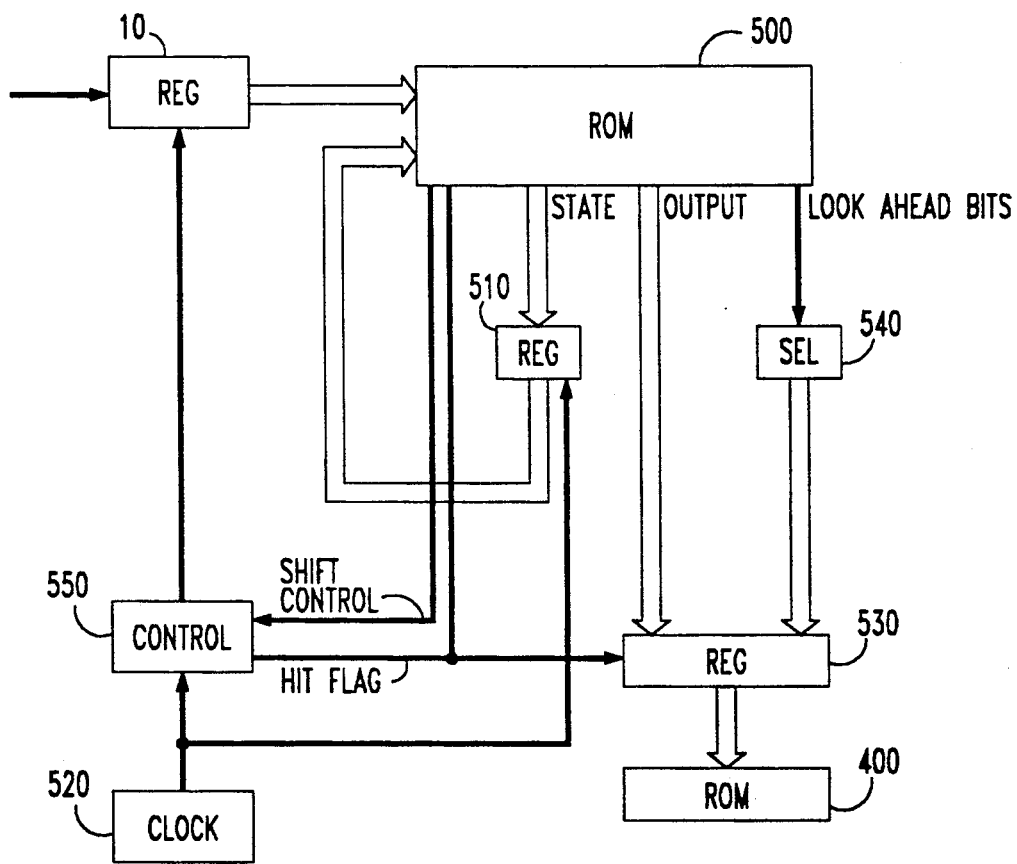
FIG. 7 illustrates a single ROM version of the variable length decoder of this invention.

In FIG. 7, register 10 applies a preselected number of most significant bits to ROM 500. As in FIG. 6, ROM 500 has 5 outputs: a look ahead bits outlook, an address pointer output, a state output, a shift control output, and a hit flag output. The state output is applied to register 510 and register 510 is clocked with clock 520. The output of register 510 is applied to address ports of ROM 500. The address pointer output of ROM 500 is applied to register 530 and a number of additional bits from register 10 are also applied to register 530. However, those bits are applied to register 530 via selector 540 which is controlled by the look ahead bits output of ROM 500. The hit flag output of ROM 500 captures the information applied to register 530. The hit flag is also applied to control block 550, which is also responsive to clock 520 and to the shift control output of ROM 500. Control block 550 resets register 510 as necessary and controls the shifting of data in register 10. Lastly, the output of register 530 is applied to ROM 400.

In operation, ROM 500 is first driven by the bits in register 10, with register 510 being reset by control block 550. At this point, the output of register 500 corresponds to the output of ROM 100 in FIG. 5. The state information is captured at that time in register 510 and applied to ROM 500. If the hit flag indicates a "hit", i.e., that a VL code was detected, register 530 captures the address pointer and the required suffix from selector 540, and applies the captured information to ROM 400. At that time, control 550 shifts the appropriate number of new bits into register 10 under control of the shift control output of ROM 500. When there is no "hit" indication, control block 550 shifts a different number of bits into register 10 (since the hit flag is not active) and ROM 500 is now responsive to new input bits from register 10 and to the state information provided by register 510. The state of the system at this point corresponds to the signals present at ROM 200 in the FIG. 5 embodiment. Continuing in this manner, the FIG. 7 structure progresses through the different segment modules in the FIG. 5 embodiment, yielding a final output in a number of clock pulses equal, at most, to the number of segment modules.

The illustrative VL code example described above deal with a minimized VL code that is most efficient vis-a-vis the number of bits employed, given the signal probabilities. The result, as seen in FIG. 3, is 6 k-nodes. Since it has been disclosed herein that reducing the number of k-nodes simplifies the decoder, it should be mentioned, perhaps, that at some sacrifice the FIG. 3 trie can be made to have fewer k-nodes. For example, if a symbol b15' is associated with symbol b15, the nodes representing node 00 and node 01 can be coalesced into a single k-node corresponding to node 0. Of course, when that is done, symbols b15 and b15' would have to carry the VL codes 001 and 000. This corresponds to a loss of efficiency in the transmission since sending 000 instead of 00 takes an extra bit, but practical situations do exist where this reduced efficiency is worth the simplification in the decoder.

The illustrative examples disclosed above include a separate ROM 400, but it should be noted that ROM 400 can be embedded in each of the segment modules. Moreover, in instances where the codes identified in a segment module have a desired relationship, then the memory 400 portion of the segment module can be folded into the preceding ROM. For example, in table 3, input 11xx identifies symbols b9, b10, b11 and b12. If those symbols happen to be expressible in the form Axx, where A is some string of digits, then ROM 100 could contain the necessary information, and there would be no need for any additional ROM storage that corresponds to a portion of ROM 400.

I claim:

1. Apparatus for decoding a stream of signals encoded with given a variable-length code (VLC) comprising:
    first means for presenting a number of bits of said stream of signals, which number is at least equal to the number of bits in the longest code of said VLC;
    a plurality of processing blocks, interconnected in a chain such that each processing block in the chain, other than the last processing block in the chain, feeds information to a next processing block in the chain, and further interconnected so that each processing block is responsive to a different group of adjacent bits presented by the first means and, in response to received information from the previous block and the group of adjacent bits, identifies a subset of said VLC.

2. The apparatus of claim 1 wherein each processing block comprises a read-only memory responsive to at least a subset of the group of adjacent bits.

3. The apparatus of claim 1 wherein each of the processing blocks decodes a portion of a trie that is pruned down to its k-nodes, where a k-node is a node of the trie which supports a binary number of leaves of any particular number code length and which has no k-nodes in its path toward the root.

4. The apparatus of claim 1 wherein the information communicated from each processing block in the chain to the next processing block in the chain is an indication as to whether a VLC code has been identified, comprises a read-only memory responsive to at least a subset of the group of adjacent bits.

5. The apparatus of claim 4 wherein the information communicated from at least one processing block in the chain to the next processing block in the chain includes state information.

6. The apparatus of claim 4 wherein the information communicated from each of the processing blocks in the chain to the next processing block in the chain includes a VLC identifier signal.

7. The apparatus of claim 1 wherein said plurality of processing blocks develops a unique address for each decoded VLC and further comprises a storage means, responsive to the developed unique address, for converting the address into a fixed-length code.

8. The apparatus of claim 1 further comprising:
    combinatorial means responsive to the first means for determining the length of a currently to be decoded code of the VLC; and
    clocked storage means interposed between selected processing blocks.

9. The apparatus of claim 8 wherein the combinational means take advantage of k-nodes found in a trie representation of the VLC.

10. A VLC decoder having an input register for storing a portion of a stream of input signals and a decoder block responsive to the register output signals, which decoder block includes a ROM, characterized in that:
    the ROM contains information that decodes a trie that is pruned down to its k-nodes, where a k-node is a node of the trie which supports a binary number of leaves of any particular number code length and which has no k-nodes in its path toward the root.

11. A VLC decoder having an input register for storing a portion of a stream of input signals and a decoder block responsive to the register output signals, which decoder block includes a ROM, the improvement comprising:
    a state register responsive to a first portion of the output of the ROM, which register is clocked with a clock signal and delivered its clocked output to address inputs of the ROM, thereby making the decoder block a finite state machine; and
    means for concatenating second portion of the output of the ROM with output signals of the input register to form an output signal of the decoder.

12. The decoder of claim 11 further comprising means for selecting the number of output signals of the input register that are concatenated in the means for concatenating under control of a fourth portion of the output of the ROM.

13. The decoder of claim 11 further comprising a hit flag at the output of the ROM that captures the information concatenated in the means for concatenating.

14. The decoder of claim 13 further comprising a ROM responsive to the means for concatenating.

15. The decoder of claim 11 further comprising a control circuit that shifts data in the input register in responsive to a fifth portion of the ROM output.

* * * * *

UNITED STATES PATENT AND TRADEMARK OFFICE
CERTIFICATE OF CORRECTION

PATENT NO. : 5,226,082

DATED : July 6, 1993

INVENTOR(S) : George John Kustka

It is certified that error appears in the above-indentified patent and that said Letters Patent is hereby corrected as shown below:

Col. 1, line 34, change "bus 21" to "bus 22".

Col. 4, Table 3,
change the heading "addresses" to "address pointers",
change the heading "Huffman codes" to "Huffman codes (input)".

Col. 5, line 8, change "11xx" to "10xx".

Col. 5, line 11, change "01xx" to "11xx".

Col. 5, Table 4,
change the heading "address" to "Huffman code",
change the heading "prefix" to "pointer prefix".

Col. 5, Table 4, in the "prefix column",
change "010" to "110",
change "011" to "111".

Col. 5, Table 5, in the "address column",
exchange the "0" and "1" entries.

Col. 5, Table 5, in the "prefix column",
change "11" to "01".

Col. 6, line 26, change "selected" to "selector".

Col. 7, line 68, delete "132,".

UNITED STATES PATENT AND TRADEMARK OFFICE
CERTIFICATE OF CORRECTION

PATENT NO. : 5,226,082
DATED : July 6, 1993
INVENTOR(S) : George John Kustka

It is certified that error appears in the above-indentified patent and that said Letters Patent is hereby corrected as shown below:

Col. 8, line 13, change "FIG. 6" to "FIG. 5".

Signed and Sealed this

Thirtieth Day of June, 1998

Attest:

BRUCE LEHMAN

Attesting Officer

Commissioner of Patents and Trademarks